Dec. 8, 1931.    E. A. SUTCLIFFE    1,835,356
GASKET
Filed Dec. 22, 1930
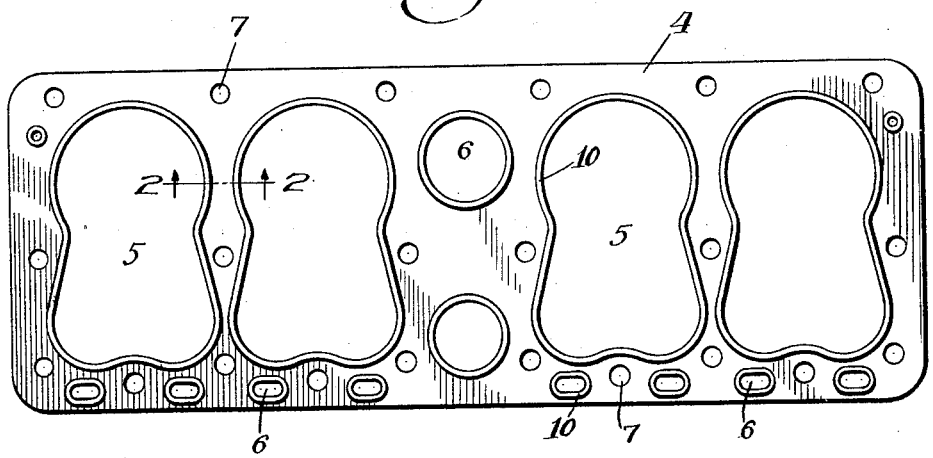
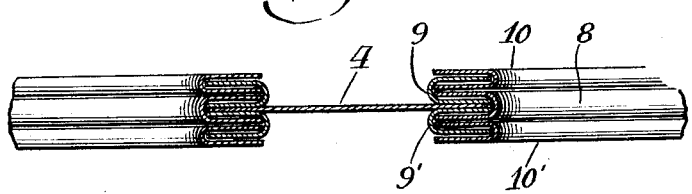
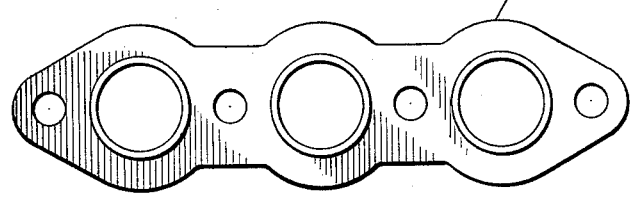
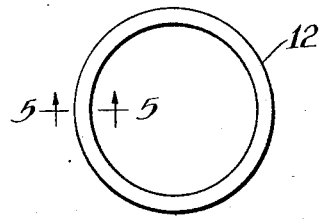
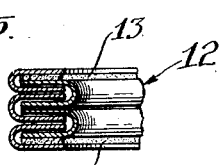

Patented Dec. 8, 1931

1,835,356

UNITED STATES PATENT OFFICE

EDWIN A. SUTCLIFFE, OF OAK PARK, ILLINOIS, ASSIGNOR TO VICTOR MANUFACTURING & GASKET COMPANY, OF CHICAGO, ILLINOIS, A CORPORATION OF ILLINOIS

GASKET

Application filed December 22, 1930. Serial No. 503,988.

This invention relates to gaskets which are designed for use in Diesel engines and other heavy duty work requiring especial means for obtaining and maintaining a tight seal.

The object of the invention is to provide a gasket with a built up marginal edge of novel construction about any opening desired to be protected to form a cushion of substantial thickness which will yield under pressure and form a tight and long-lived seal.

Another object of the invention is to provide a gasket made up of a plurality of rings formed by bending sheet metal upon itself and interlocking the rings loosely so that they will remain in assembled relation without possibility of displacement and yield easily under pressure to conform with the joint and form a solid and substantial seal.

The invention may be embodied in single ring gaskets or in cylinder head, manifold and other gaskets having a plurality of openings to be sealed and in the accompanying drawings I have selected simple forms of embodiment to illustrate the invention and referring thereto Fig. 1 is a plan view of a cylinder head gasket embodying the invention.

Fig. 2 is a sectional view on the line 2—2 of Fig. 1.

Fig. 3 is a plan view of a manifold gasket embodying the invention.

Fig. 4 is a plan view of a ring gasket.

Fig. 5 is an enlarged sectional view on the line 5—5 of Fig. 4.

The cylinder head gasket comprises a sheet body 4 having combustion openings 5, water openings 6 and bolt openings 7 therein. These openings may be made in any number, size and shape to suit different engine designs, or for other purposes. The marginal edge of the gasket about any opening to be sealed is provided with a cushion or edging built up of a plurality of metal rings which are interlocked in a manner to hold them in fixed relation so that they will not become displaced after once being assembled. Each ring is made of sheet metal bent upon itself from the inside outwardly or from the outside inwardly substantially U-shaped in cross-section. As many rings as may be required to form the gasket are assembled in interlocked relation with the bights thereof alternately disposed on the inside and on the outside of the gasket. In Fig. 2 I have shown a satisfactory assemblage of rings and referring thereto the middle ring 8 is formed by bending the metal upon itself from its inside diameter outward so that it will be open at its outer edge. This ring is formed loosely on the marginal edge of the sheet body about the opening. Intermediate rings 9, 9' are open at their inner edge and these rings are interengaged with the ring 8. Outer rings 10, 10' are formed like the ring 8 open at their outer edge and these rings are interengaged with the intermediate rings The outer side of ring 9 is located in ring 10 and the outer side of ring 9' is located in ring 10'; the inner sides of rings 9, 9' are located in ring 8 and on opposite sides of the body 4 with which they engage. The inner side of ring 10 is located in ring 9 and the inner side of ring 10' is located in ring 9', opposite the sides of ring 8. In the construction shown in Fig. 2 and herein described there are five layers of ring metal on each side of the body 4 at the margin of the opening to be sealed and these layers are loosely arranged with relation to each other so as to provide a cushion which will yield under pressure and form a solid substantial metal wall about the marginal edge of the opening in the body to conform with any irregularities in the joint and to produce a tight seal. I may omit the rings 10 and 10' or I may add additional rings as occasion may require. In Fig. 1 I have shown all the combustion and water openings protected by the ring gaskets and all connected together by the body in a unitary gasket. It is desirable to seal all of the combustion openings and generally all of the water openings but for some purposes it may be desirable to omit sealing some of the water openings and gaskets may be made and applied accordingly. Each ring assembly constitutes a gasket and may be embodied in a unitary cylinder head gasket 4 as described, or in a manifold gasket 11, Fig. 3, or it may be used singly in circular form 12, Fig. 4, or in any other desired form. I may also use one or more rings of asbestos, paper or other gasket material between the metal rings, and as illustrative thereof I have shown flat asbestos rings 13 between the two outer sides at each end of the gasket 12.

I do not restrict the invention to the selected embodiments illustrated in the drawings but reserve the right to make all such changes in the form, construction and arrangement of parts as may be necessary or desirable to adapt the invention for different kinds of gaskets, or for other reasons, within the scope of the following claims.

I claim:

1. A gasket comprising a plurality of separate horizontally disposed U-shaped flat-sided rings, each ring being formed of sheet metal bent upon itself, some rings being bent from the inside outwardly and some being bent from the outside inwardly and each ring being open at one edge and having its bight at the other edge, said rings being assembled with their sides interlocked and their bights and their open edges alternately disposed at the inside and at the outside of the gasket.

2. A gasket comprising a plurality of separate horizontally disposed U-shaped flat-sided rings, each ring being formed of sheet metal bent upon itself, some rings being bent from the inside outwardly and some being bent from the outside inwardly and each ring being open at one edge and having its bight at the other edge, said rings being assembled with their sides interlocked and their bights and their open edges alternately disposed at the inside and at the outside of the gasket, and rings of gasket material included within the gasket between layers of said metal rings.

3. A gasket comprising a body having an opening therein, a substantially U-shaped intermediate ring with its bight at its inner edge enclosing the marginal edge of the body about said opening, and other substantially U-shaped rings with the bight at their outer edges interlocked with said intermediate ring upon said body.

4. A gasket comprising a body having an opening therein, a substantially U-shaped intermediate ring with its bight at its inner edge enclosing the marginal edge of the body about said opening, and other substantially U-shaped rings with the bight at their outer edges interlocked with said intermediate ring and with sides thereof arranged on opposite sides of and opposing the marginal edge of said body.

5. A gasket comprising a body having an opening therein, a substantially U-shaped ring having its bight at its inner edge and enclosing the marginal edge of the body about said opening, another substantially U-shaped ring having its bight at its outer edge and interlocked with said first mentioned ring and having one side enclosed between said marginal edge of the body and one side of said first mentioned ring.

6. A gasket comprising a body having an opening therein, a substantially U-shaped ring having its bight at its inner edge and enclosing the marginal edge of the body about said opening, another substantially U-shaped ring having its bight at its outer edge and interlocked with said first mentioned ring and having one side enclosed between said marginal edge of the body and one side of said first mentioned ring, and still another substantially U-shaped ring having its bight at its inner edge and interlocked with the second mentioned ring with its inner side enclosed within said second mentioned ring between one side of the first mentioned ring and one side of the second mentioned ring.

EDWIN A. SUTCLIFFE.